Sheet 1 - 2 Sheets.
I. M. Singer.
Sewing Machine.
No. 278
Reissued Oct. 3, 1854.
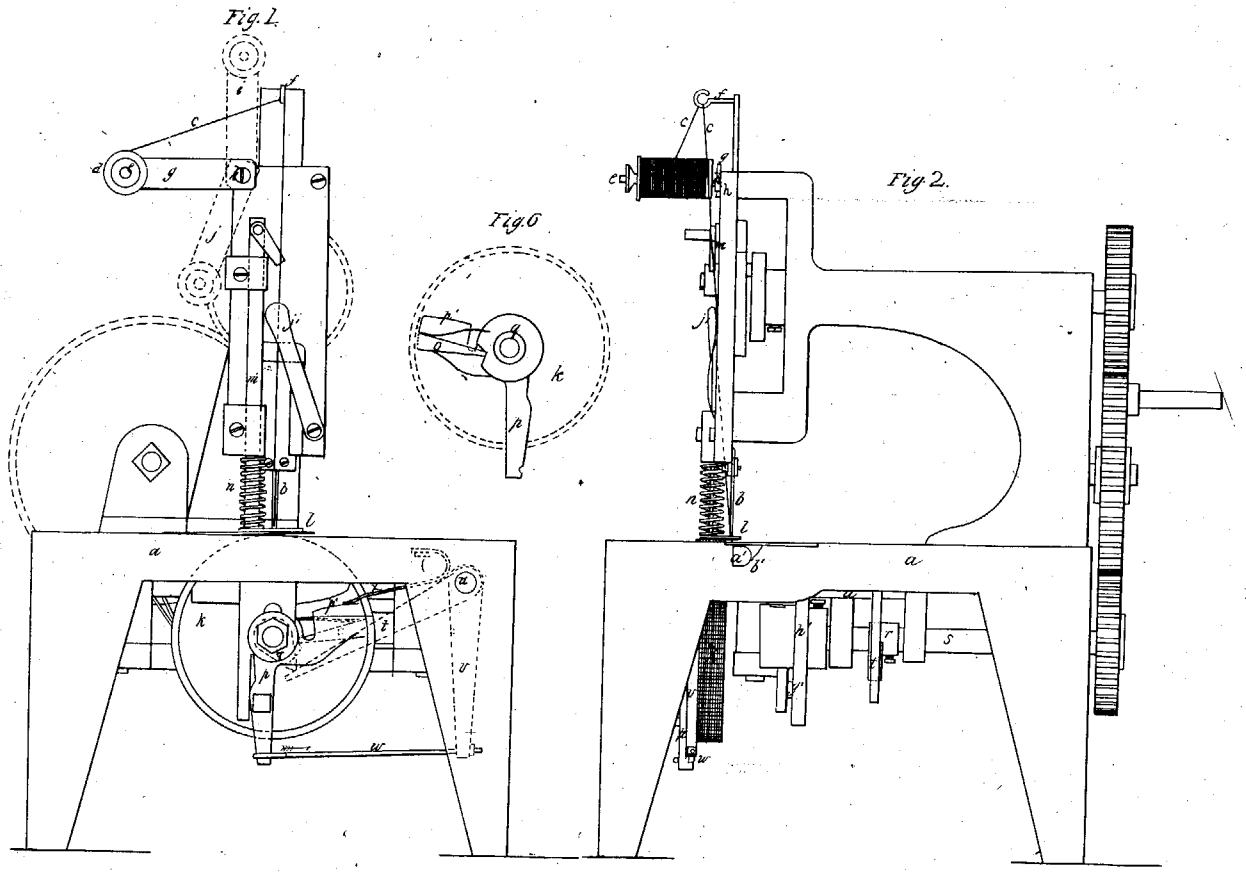

I. M. Singer.
Sewing Machine.
No. 278
Reissued Oct. 3, 1854.
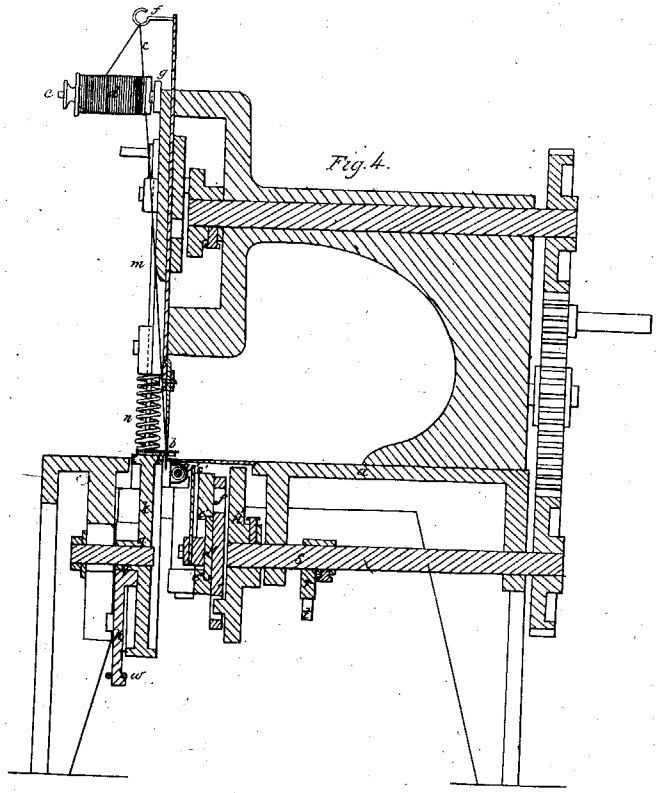
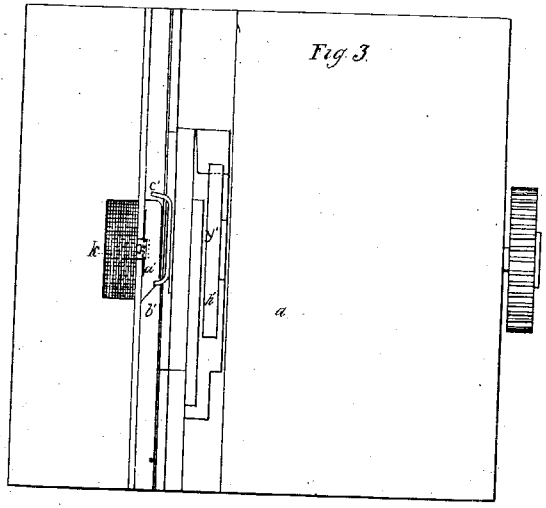
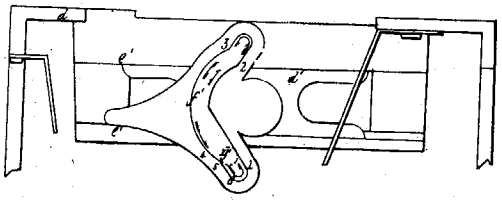

UNITED STATES PATENT OFFICE.

ISAAC M. SINGER, OF NEW YORK, N. Y.

IMPROVEMENT IN SEWING-MACHINES.

Specification forming part of Letters Patent No. 8,294, dated August 12, 1851; Reissue No. 278, dated October 3, 1854.

*To all whom it may concern:*

Be it known that I, ISAAC M. SINGER, of the city, county, and State of New York, have invented certain new and useful Improvements in Machines for Sewing Seams in Cloth and other Substances; and I do hereby declare that the following is a full, clear, and exact description thereof, reference being had to the accompanying drawings, making part of this specification, in which—

Figure 1 is a front elevation of the machine; Fig. 2, a side elevation; Fig. 3, a plan of the table with the plates that cover the shuttle removed; Fig. 4, a vertical section passing through and in the plane of the cam-shaft; Fig. 5, a cross-section passing between the carriage of the shuttle-driver and the wheel that carries the crank-pin, and looking toward the front of the machine; and Fig. 6, a section of feed-motion.

The same letters indicate like parts in all the figures.

The first part of my invention relates to the method of drawing the stitch by the shuttle; and it consists in giving to the shuttle, after the needle has been drawn out of the loop, a slight additional forward movement as the needle is completing its upward movement and at the time the feed motion is given to the cloth, by means of which there are three pulls given simultaneously—viz., the upward pull of the needle on the needle-thread, the feed motion of the cloth in one direction, and of the shuttle in the opposite direction—so that the two threads are drawn together to draw the stitch tight.

The second part of my invention relates to the method of controlling the thread during the motion of the needle by means of a friction-pad, which makes a slight pressure on the thread between the guide and the cloth. The thread from the friction-bobbin passes through a guide connected with the needle-carrier, so that as the needle rises the threads shall be drawn tight to form the stitch, and from this it follows that as the needle descends, and with it the guide, the thread will form a loop above the cloth, which is liable to be caught or to be cut by the needle. With the view to obviate this in a previous invention made by me, I carried the thread through a spring-guide, the tension of which took up the slack as the needle descended, and although this answered the purpose to a certain extent, yet if there were not sufficient friction presented to the thread by the cloth the moment the needle began to rise, the tension of the spring drew out the loop, so that the shuttle failed to pass through the loop, particularly when working rapidly, in which case the rebound of the spring was very apt to draw out the loop. The defects of the spring-guide are, however, entirely obviated by the employment of a friction-pad, which, being inert, presents sufficient resistance to the thread, as the needle descends, to prevent the making of slack above the cloth, and yet not sufficient to prevent the needle from drawing the thread through to make the loop below, and when the needle rises there is no tendency to draw out the loop, the friction-pad simply holding the thread in place.

The third part of my invention consists in placing the friction-bobbin, from which the thread is drawn by the needle, on an adjustable arm attached to the frame, so that its angle relatively to the guide on the needle-carrier, or the equivalent therefor, through which the thread passes, can be changed at will, so that by changing the position of the arm the motion of the needle-carrier will draw out more or less thread, as may be required. In some machines heretofore made the bobbin was carried by the needle-carrier, and hence the motion of the needle had to be determined by the length of thread required to form the loop, which was objectionable, as in many instances this range of motion was unnecessarily long for all other purposes; but by placing the bobbin on an adjustable arm, and thence carrying a thread through a guide on the carrier or the equivalent therefor, by simply shifting the position of the bobbin the length of the thread for forming the loop can be either longer or shorter than the range of motion of the needle. In this way I am enabled to construct the machine with a range of motion just sufficient to form the stitch, and then regulate the length of thread at pleasure for the loop by the position of the bobbin.

The last part of my invention relates to the method of feeding the cloth during the operation of sewing to determine the length of the stitches. Heretofore the cloth has either been slipped onto teeth arranged in a bar on the periphery of a feeding-wheel, which is objectionable for the reason that the cloth is pinned by the numerous pins, and there was great difficulty of turning the cloth to sew curved seams when thus held by pins; and other machines have been made with a spring pressure-pad, making pressure on the cloth or other substance to be sewed to hold it to the surface of a carriage moving with the cloth, and to which the feed motion is imparted; but this is defective, for the reason that it does not admit of turning the cloth during the operation of sewing, and therefore such a machine is ill adapted to the sewing of curved or angular seams. To obviate these objections the nature of this part of my said invention consists in moving the cloth to space stitches in a sewing-machine by the friction-surface of the periphery of a wheel, or any mechanical equivalent for such surface, when combined with a spring plate or pad, which presses the cloth or other substance against such feeding-surface to make the required friction, while at the same time the said plate or pad, by its yielding properly, can adapt itself to any varying thickness arising from imperfect weaving, or spinning, or seams. By this means the cloth is only held at one part of its length and for a short distance, and that in immediate proximity to the needle, so that the operative can readily turn it during the operation of sewing, and thus give any direction to the seam.

In the accompanying drawings, *a* represents the frame, and *b* the straight needle on the lower end of the carrier. The thread *c* comes from a bobbin, *d*, which turns on a stud, *e*, and held by friction in any desired manner to prevent it from turning freely. From this bobbin the thread passes through a guide, *f*, attached to and moving with the needle carrier, and thence it passes through the eye of the needle some distance above the point. The stud *e*, on which the bobbin turns, is on the outer end of an arm, *g*, secured by a screw, *h*, to the frame, so that the bobbin can be elevated or depressed to any extent required. If the bobbin be elevated to the position represented by dotted lines *i*, the end of the thread being held by the cloth, it will be seen that the length of thread drawn from the bobbin to make the loop for the passage of the shuttle will be equal to the range of motion of the needle, and, if depressed to the position represented by the dotted lines *j*, that the length drawn from the bobbin will be double the range of motion of the needle, and that this quantity will vary as the bobbin is either elevated or depressed. In this way, whatever may be the range of motion of the needle, the length of thread for the loop for various qualities of sewing can be varied at pleasure by simply shifting the position of the bobbin.

The cloth to be sewed is placed on the table of the frame and resting on the periphery of the feeding-wheel *k*, and pressed thereto by a plate, *l*, on the end of a sliding bar, *m*, which is forced down by a helical spring, *n*. Instead of arming the periphery of the feed-wheel with pins, as heretofore, a fine thread is cut thereon; or, instead of threads, fine parallel grooves can be cut; but in either case the threads or fillets between the grooves are brought to a sharp edge, and if made of cast-iron, the edges, by the breaking of the metal, will become slightly serrated; but if made of wrought-iron, they should be slightly serrated by any appropriate instrument. When the cloth is pressed against this surface so grooved and serrated, a sufficient hold is taken of the surface of the cloth to move it forward without slipping, and without the necessity of piercing the cloth, and therefore the attendant can turn the cloth as may be desired to sew curved seams, which could not be done conveniently when pins on the periphery of the wheel passed through the cloth. The feeding motion is given to the feed-wheel by means of a knuckle, *o*, jointed to a lever, *p*, that turns on the hub *q* of the wheel, so that when the lever *p* is moved in the direction of the arrow the outer end of the knuckle *o* is forced in contact with the inner periphery of the feed-wheel with sufficient force to turn it without the necessity of cutting teeth on the said periphery. The required motion for operating the lever and knuckle is obtained from a cam, *r*, on the cam-shaft *s*, which at every revolution acts on an arm, *t*, of a rock-shaft, *u*, which carries another arm, *v*, connected by a link, *w*, with the lever *p*, and provided with adjusting-nuts. There is a spring, *x*, which bears on the arm *p'* of the lever *p*, to force back the said arm and knuckle when the cam has passed, that the knuckle may take a new hold on the periphery of the wheel. As there are no teeth on the periphery of the wheel, and the knuckle acts on it simply by the bite of the surface, it will be perceived that any desired motion can be given to the wheel by simply regulating the play of the lever. The play of the lever is regulated by the length of the link which connects it with the arm *v* of the rocker, the interposed spring answering the purpose of carrying back the arm and the rocker.

The shuttle *a'* is semi-cylindrical, with the forward end pointed and the back end rounded. It slides in a groove, *b'*, on the table of the frame, and is embraced between the ends of a driver, *c'*—that is, one end of the driver rests against the back end of the shuttle, and the other end of the driver against a shoulder formed by cutting out a part of the conical part of the forward end of the shuttle. The shuttle should have sufficient play between the ends of the driver for the free passage of a thread between it and a driver at one end when the two are in contact with the other, and vice versa.

The driver is attached to and operated by a carriage, *d'*, adapted to slide in appropriate ways, *e' e'*, in the frame, and this carriage is formed with a cam-groove, *f'*, in which fits and runs a crank-pin, *g'*, of a wheel, *h'*, on the cam-shaft. The form of the cam-groove *f'* is represented in Fig. 5, and is such that as the crank-pin passes from the point 1 to 2 in the direction of the arrow it carries the shuttle back, the needle at the same time descending to carry the thread through the cloth, and as the needle rises, forming the thread below the cloth into a loop, the shuttle moves forward by the passage of the crank-pin in the direction of the arrow from the point 2 to 3 in the cam-groove, thus causing the shuttle to enter the loop; the thread passing between the point of the shuttle and the forward end of the driver. The shuttle is then brought to a state of rest by the continued motion of the crank-pin in a return direction in the cam-groove from the point 3 to 4, where it is concentric with the crank. From the point 4 to 5 the groove runs a little within the circle to give a slight back motion to the shuttle-driver, that the thread may pass between the back end of the shuttle and the driver as the needle rises to draw the stitch, and then from 5 to 6, the groove runs a little out of the circle to force the shuttle forward to draw the shuttle-thread at the same time that the feed motion is given to the cloth in the opposite direction and while the needle completes its upward motion, thus drawing the two threads simultaneously to complete and draw the stitch tight on both faces of the cloth. The motions above described are then repeated for another stitch. The thread, as it passes from the loop or guide *f* on the needle-carrier to the needle, passes under a spring-pad, *j'*, attached to the frame, which pad makes a gentle pressure on it, so that as the needle descends to carry the thread through the cloth the slack formed by the descent of the needle shall be all above this pad, instead of being just above the cloth, where it would be liable to tangle or to be cut by the needle, and besides this the holding of the thread by the friction-pad during the descent of the needle is necessary to insure the carrying of the thread through the cloth in the same position relatively to the needle, and thus insure the laying of the stitches in the same line.

I do not wish to be understood as limiting myself to the special construction and arrangements hereinabove specified, but claim the right to modify them, so long as I attain the same ends by equivalent means.

What I claim as my invention, and desire to secure by Letters Patent, is—

1. Giving to the shuttle an additional forward movement after it has been stopped to close the loop, as described, for the purpose of drawing the stitch tight when such an additional movement is given at and in combination with the feed motion of the cloth in the reverse direction, and the final upward motion of the needle, as described, so that the two threads shall be drawn tight at the same time, as described.

2. Controlling the thread by what I have termed the "friction-pad" between the seam and the bobbin, or any equivalent therefor, substantially as described, and for any or all of the purposes specified.

3. Placing the bobbin from which the needle is supplied with thread on an adjustable arm attached to the frame, substantially as described, when this is combined with the carrying of the said thread through an eye or guide attached to and moving with the needle-carrier, as described, or the equivalent therefor, whereby any desired length of thread can be given for the formation of the loop without varying the range of motion of the needle, as described.

4. In a sewing-machine, feeding the cloth or other substance to determine the space between the stitches by the friction of the surface of the periphery of the feed-wheel, or any equivalent feeding-surface, substantially as specified, in combination with a spring pressure plate or pad, which grips the cloth or other substance against such feeding-surface, substantially as specified, and for the purpose set forth.

ISAAC M. SINGER.

Witnesses:
WM. H. BISHOP,
ANDREW DE LACEY.